March 27, 1962 W. L. CRESAP 3,026,942
HELICOPTER ROTOR SYSTEM
Filed July 7, 1959 2 Sheets-Sheet 1

March 27, 1962  W. L. CRESAP  3,026,942
HELICOPTER ROTOR SYSTEM
Filed July 7, 1959  2 Sheets-Sheet 2
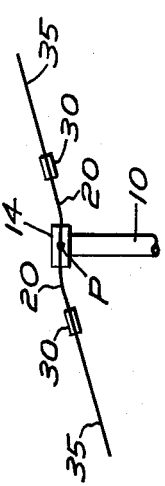
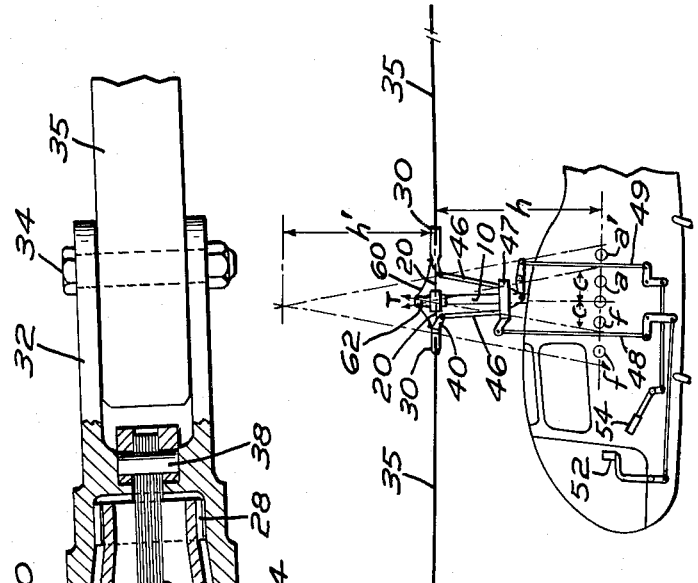
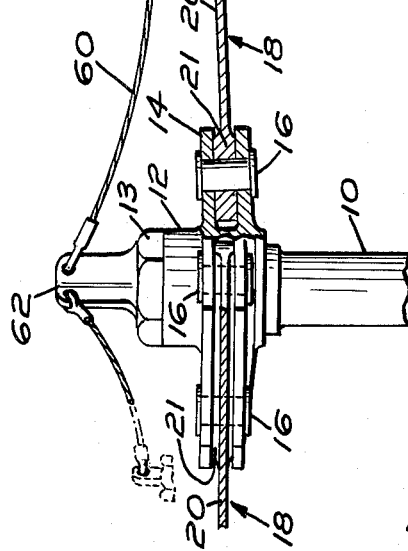
INVENTOR:
WESLEY L. CRESAP
BY: Beau, Brooks, Buckley & Beau,
ATTORNEYS.

United States Patent Office 3,026,942
Patented Mar. 27, 1962

3,026,942
HELICOPTER ROTOR SYSTEM
Wesley L. Cresap, Fort Worth, Tex., assignor to Bell
Helicopter Corporation, Hurst, Tex.
Filed July 7, 1959, Ser. No. 825,587
6 Claims. (Cl. 170—160.25)

This invention relates to rotary wing aircraft, and more particularly to multi-bladed semi-rigid rotor constructions in helicopter aircraft or the like. The present invention, furthermore, relates to specific improvements in rotor constructions generally of the type disclosed in U.S. patent application Serial No. 690,245 filed October 15, 1957, now Patent 2,949,965.

A primary object of the present invention is to provide a rotor as aforesaid which is of structurally simplified form, and which obtains maneuvering control (through tilting of the rotor tip path plane) by flexures of hub-beam components of novel construction.

Another object is to provide a novel semi-rigid type rotor having three or more blades, providing for adequate flight maneuvering control while tolerating a greater range of longitudinal and lateral aircraft center of gravity locations.

Another object is to provide in a rotor hub as aforesaid an improved "free flapping" type joint construction.

Another object is to provide an improved hub construction as aforesaid which is mechanically simplified.

Another object is to provide an improved rotor hub as aforesaid which incorporates in improved manner the so-called "offset hinge" type and "vector tilting" effects of more complicated rotor constructions.

Still another object is to provide a rotor hub construction as aforesaid which also embodies inherently the so-called "spring moment" effect discussed for example in the aforesaid application Serial No. 690,245.

Other objects and advantages of the invention will appear from the specification hereinafter.

Whereas, prior type semi-rigid or "see-saw" rotors are freely hinged to the drive shaft (or rotor mast), and therefore aircraft control effects are obtained solely by inclination of the rotor thrust vector; the present invention provides a simplified hub construction whereby additional control moments can be produced at the rotor hub by using cyclic feathering to incline the rotor disc, as well as other advantageous features. For example, in application Serial No. 690,245 an isotropic spring restraint is imposed between the mast and the otherwise free universally-mounted rotor hub, and by use of a suitable spring in such an arrangement control moments about the aircraft C.G. may be multiplied two or three fold. The present invention however, contemplates a greatly simplified (from the mechanical-structural standpoint) rotor hub design which fulfills the above stated requirements through use of novel flexible beam components.

By way of example, one form of the invention is described hereinafter, and is illustrated in the accompanying drawing wherein:

FIG. 2 is a fragmentary section taken along the line II—II of FIG. 1; and

FIGS. 3–4 illustrate schematically the operation of the hub construction of the invention.

Figure 1:
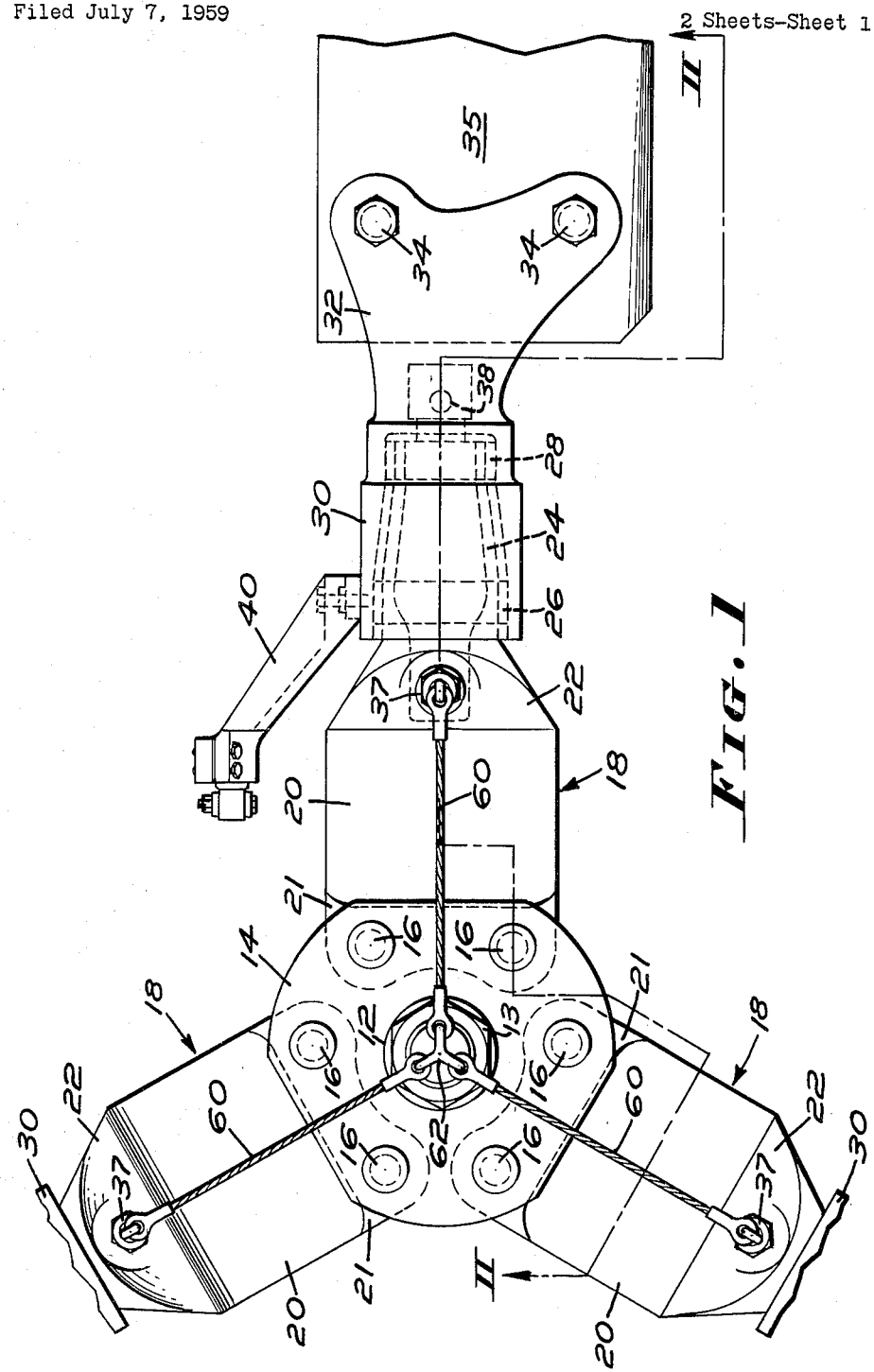
FIG. 1 is a fragmentary plan view of a helicopter aircraft lift rotor embodying the invention.

As illustrated herein, the rotor may be mounted on a helicopter rotor drive shaft (or mast) as indicated at 10, by means of a hub 12 which is slip-fitted in driving keyed relation on the mast 10. A mast nut 13 locks the hub in position upon the mast 10. The hub includes an integrally formed clevis-like flange portion 14 carrying clevis pins 16 at positions spaced perimetrally of the hub for connecting reception of flexible beam members 18 extending radially of the hub and corresponding to the number of blades to be employed. The central body portions 20 of the beams 18 are of thin metal plate form terminating in thickened inner end portions 21 in the regions of their connections to the clevis pins 16. At their outer ends the beams 18 terminate in clevis portions 22 leading into generally cylindrical spindle portions 24. By means of intermediately disposed roller bearings 26, 28 or the like, the spindles 24 mount cylindrically socketed end portions 30 of the rotor blade grip devices which terminate at their other ends in clevis shaped blade grip portions 32. The grip portions 32 mount by means of bolts 34 the rotor blades 35. Torsionally flexible tension straps or the like as indicated at 36 (FIG. 2) are connected at their opposite ends by means of pins 37, 38 carried by the clevises 22, 23 respectively, to transmit the centrifugal loads on the blades through the hub device.

Thus it will be appreciated that the blades 35 are individually mounted on the hub structure for pitch change rotation purposes upon their bearings 26, 28; blade pitch control horns or the like being provided as indicated at 40 (FIG. 1) for pilot control of the blade pitch angles as disclosed for example in application Serial No. 690,245 aforesaid. The horn actuating push-pull rod and swash plate control systems are indicated at 46, 47, 48, 49 (FIG. 3). The pilot cyclic pitch control lever is illustrated at 52, and the collective pitch control lever is shown at 54.

As shown schematically in FIG. 3, the invention provides for maneuvering control as follows. When the pilot control system is adjusted to change the pitch of the blades cyclically, the blades alternately climb and dive as they rotate and consequently cause their flexible beams 18 to "flap" in corresponding direction. Thus, the hub structure is elastically deformed and the rotor tip path plane tilts as illustrated for example in FIG. 4. In this condition the general axis of rotor pivoting may be indicated at $p$ and the rotor thrust vector as at T (FIG. 3). Also, as shown in FIG. 3, the maximum fore and aft flapping angle of the rotor as produced by the cyclic control thereof and as limited by the hub and control system mechanical clearances, is indicated at $c$—$c$. The vertical distance from the aircraft center of gravity to the elevation of the rotor pivot axis is indicated at $h$. Whereas, in a conventionally mounted free pivoting rotor without elastic restraint as provided by the beams 18, the allowable center of gravity range of positions will lie between points such as indicated at $f$ and $a$ (FIG. 3); and these points must lie somewhat inside the area determined by projection of the rotor thrust vector line T in the maximum tilt angles $c$—$c$. Some control margin must be preserved for maneuvering purposes and to permit for correction of aerodynamic disturbances.

However, in the case of the present construction, the provision of an overall hub centering resiliency (by appropriate selection of spring characteristics for the beams 20) of a stiffness $k$ (ft.-lbs./radian) in terms of the moment generated at point $p$ due to the inclination of the rotor disc, provides the requisite additional control moment. The maximum value of this moment equals $c \times k$. The effect is equivalent to raising point $p$ through a height $h'$ where $$h' = \frac{k}{W}$$

when $W$ represents the gross weight of the helicopter. This in turn effectively increases the allowable center of gravity travel by an amount approximately equal to $c \times h'$, or $$c \times \frac{k}{W}$$

at each end of the range. Thus the forward and aft limits of travel may be extended as to positions $f'$ and $a'$ on the diagram of FIG. 3.

Thus it will be appreciated that by virtue of the present invention a multi-bladed rotor construction is provided which embodies, in combination with the advantages of a great structural simplification, the further advantages of additional controllability, the so-called "offset hinge" and "tilting of vector" and "spring moment" effects. The "flexible beam" mounting arrangement of the invention eliminates need of universal joint connection devices such as are used in earlier hub designs. The oscillatory stresses in the flexible beam members are kept within acceptable limits by making these parts thin in section, while relatively wide in chord-wise direction to provide sufficient stiffness against lag forces. As illustrated, droop control cables 60 may be connected between the pins 37 and the vertical extension 62 of the mast nut 13, or to other suitable points, to maintain the ends of the rotor blades against drooping interferences with the helicopter fuselage when the rotor is idling or stationary.

I claim:

1. A helicopter aircraft lift rotor and control system, comprising a rotor drive shaft, a hub fixed to and rigid with said shaft and extending radially therefrom, a plurality of resilient beams fixed at their inner ends to said hub to extend radially from said hub in cantilever spring fashion, a rotor blade mounted directly upon the outer end of each of said beams so as to be carried solely thereby while being freely rotatable thereon for pitch change purposes, said beams being resilient in bending in the general direction of the axis of rotation of said hub while being rigid in directions generally tangentially of said hub, a swash plate mounted upon said drive shaft and pilot-controllable to tilt relative thereto, and push-pull linkage selectively interconnecting said swash plate and said rotor blades to adjust the pitch angles of said blades about their pitch change axes in response to pilot-adjustments of said swash plate.

2. In a helicopter aircraft, a rotor system including a rotor drive shaft, a hub fixed to and rigid with said shaft to rotate therewith, a plurality of cantilever spring beams extending in radial directions from said hub, a rotor blade mounted directly upon each of said beams so as to be carried thereby and freely rotatable thereon about the longitudinal pitch change axis of said blade, said beams being flexible and resilient in directions generally parallel to the axis of rotation of said rotor, and pilot control means operably connected to said rotor blades for selective control of the pitch angle adjustments thereof.

3. In a helicopter aircraft, a rotor system including a rotor drive shaft, a hub fixed to and rigid with said drive shaft, a hub fixed to and rigid with said shaft to extending in radial directions from said hub, a rotor blade mounted directly upon each of said beams so as to be carried thereby and freely rotatable thereon about the longitudinal pitch change axis of said blade, said beams being flexible and resilient in torsion and in directions generally parallel to the axis of rotation of said rotor, and pilot control means operably connected to said rotor blades for selective control of the pitch angle adjustments thereof.

4. In an aircraft, a rotor system including a drive shaft, a hub device fixed to and rigid with said shaft to rotate therewith, said hub device having a plurality of blade support portions extending in radial directions, a rotor blade mounted directly upon each of said support portions so as to be carried thereby and freely rotatable thereon about their longitudinal pitch change axes, said hub device being resilient so as to permit under elastic restraint the rotor blade tip path plane to incline away from its normal right angle relationship with the longitudinal axis of said mast, and pilot-controllable linkage means operably connecting to said rotor blades for control of the pitch adjustments thereof about their longitudinal pitch change axes.

5. In a helicopter aircraft, a lift rotor system including a rotor drive shaft, a hub assembly fixed to and rigid with said shaft to rotate therewith and having a plurality of arms extending in radial directions from said shaft, a rotor blade mounted directly upon the outer end of each of said arms so as to be carried thereby and freely rotatable thereon about the longitudinal pitch change axis of the blade, said hub assembly being flexible and resilient in torsion and in directions parallel to the axis of rotation of said shaft so as to permit under elastic restraint the rotor blade tip path plane to incline away from its normal right angle relationship with the longitudinal axis of said mast, and pilot control means operably connected to said rotor blades for selective control of the pitch angle adjustments thereof.

6. In an aircraft, a rotor system including a drive shaft, a hub device fixed to and rigid with said shaft to rotate therewith, said hub device being fixedly mounted at its center to said shaft to extend radially therefrom in cantilever fashion and having a plurality of resilient blade support arms extending outwardly therefrom in radial directions, a rotor blade mounted directly upon each of said support arms so as to be carried thereby and freely rotatable thereon about the blade longitudinal pitch change axis, said support arms being resilient so as to permit under elastic restraint the rotor blade tip path plane to incline away from its normal right angle relationship with the longitudinal axis of said mast, and pilot-controllable linkage means operably connecting to said rotor blades for control of the pitch adjustments thereof about their longitudinal pitch change axes.

References Cited in the file of this patent

UNITED STATES PATENTS

| 2,432,677 | Platt | Dec. 16, 1947 |
| 2,455,006 | Hays | Nov. 30, 1948 |

FOREIGN PATENTS

| 418,698 | Great Britain | Oct. 30, 1934 |
| 1,163,970 | France | Oct. 3, 1958 |
| 807,423 | Great Britain | Jan. 19, 1959 |
| 819,214 | Great Britain | Sept. 2, 1959 |

UNITED STATES PATENT OFFICE
CERTIFICATE OF CORRECTION

Patent No. 3,026,942                 March 27, 1962

Wesley L. Cresap

It is hereby certified that error appears in the above numbered patent requiring correction and that the said Letters Patent should read as corrected below.

Column 2, line 11, for "of" read -- or --; line 18, for "23" read -- 32 --; column 3, line 59, for "drive shaft, a hub fixed to and rigid with said shaft to" read -- rotate therewith, a plurality of cantilever hub beams --.

Signed and sealed this 10th day of July 1962.

(SEAL)
Attest:

ERNEST W. SWIDER                    DAVID L. LADD
Attesting Officer                     Commissioner of Patents